(12) United States Patent
Becker et al.

(10) Patent No.: US 7,577,220 B2
(45) Date of Patent: Aug. 18, 2009

(54) APPARATUS AND METHOD FOR READJUSTMENT OF A SAMPLING TIME IN RADIO RECEIVERS

(75) Inventors: Burkhard Becker, Ismaning (DE); Steffen Paul, Baierbrunn (DE); Thomas Ruprich, München (DE)

(73) Assignee: Infineon Technologies AG, Munich (DE)

( * ) Notice: Subject to any disclaimer, the term of this patent is extended or adjusted under 35 U.S.C. 154(b) by 578 days.

(21) Appl. No.: 11/103,039

(22) Filed: Apr. 11, 2005

(65) Prior Publication Data

US 2005/0238124 A1 Oct. 27, 2005

Related U.S. Application Data

(63) Continuation of application No. PCT/DE03/02963, filed on Sep. 5, 2003.

(30) Foreign Application Priority Data

Oct. 15, 2002 (DE) .................................. 102 48 052

(51) Int. Cl.
*H04L 7/00* (2006.01)
*G06F 17/17* (2006.01)

(52) U.S. Cl. ...................................... 375/355; 708/313

(58) Field of Classification Search ................ 375/350, 375/346, 316, 229, 232, 236, 152, 150, 147, 375/140, 343, 340, 354, 355, 371, 373, 377; 708/290, 300, 100, 200, 313, 314, 422, 90

See application file for complete search history.

(56) References Cited

U.S. PATENT DOCUMENTS

| | | | | |
|---|---|---|---|---|
| 4,905,101 A | * | 2/1990 | Ohta et al. | ..................... 386/90 |
| 5,757,683 A | * | 5/1998 | Deczky | ...................... 708/319 |
| 6,205,167 B1 | * | 3/2001 | Kamgar et al. | ............... 375/134 |
| 6,370,184 B1 | | 4/2002 | Hellberg | |
| 6,563,897 B1 | * | 5/2003 | Kitta | ........................... 375/375 |
| 6,738,608 B2 | * | 5/2004 | Black et al. | .................. 455/260 |
| 6,839,380 B1 | * | 1/2005 | Ding et al. | ................... 375/149 |
| 6,996,193 B2 | * | 2/2006 | Yamagata et al. | ........... 375/329 |

FOREIGN PATENT DOCUMENTS

DE 199 53 350 A1 5/2001
WO WO 01/33793 A2 5/2001

OTHER PUBLICATIONS

"Interpolation and Decimation of Digital Signals—A Tutorial Review", Ronald E. Crochiere and Lawrence R. Rabiner, Proceedings of the IEEE, vol. 69, No. 3, Mar. 1981, pp. 300-331.
International Search Report, Int'l Application No. PCT/DE03/02963, Int'l Filing Date Sep. 5, 2003, 2 pgs.

* cited by examiner

*Primary Examiner*—Mohammad H Ghayour
*Assistant Examiner*—Vineeta S Panwalkar
(74) *Attorney, Agent, or Firm*—Eschweiler & Associates, LLC

(57) ABSTRACT

An apparatus for readjustment of a sampling time in a radio receiver includes a component for determination of any sampling time error in a discrete-value received signal that emits a sampling time error signal. A filter arrangement is provided that includes a multi-rate filter that filters the sampling time error signal. A correction element receives the discrete-value received signal and the filtered sampling time error signal, and emits a discrete-value received signal whose timing has been corrected in accordance with the sampling time error.

17 Claims, 2 Drawing Sheets

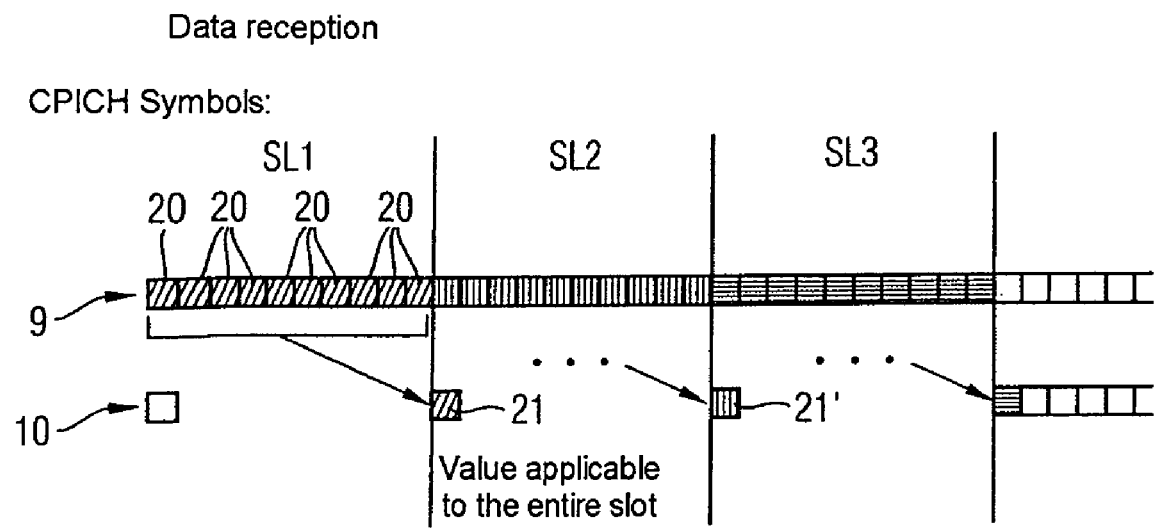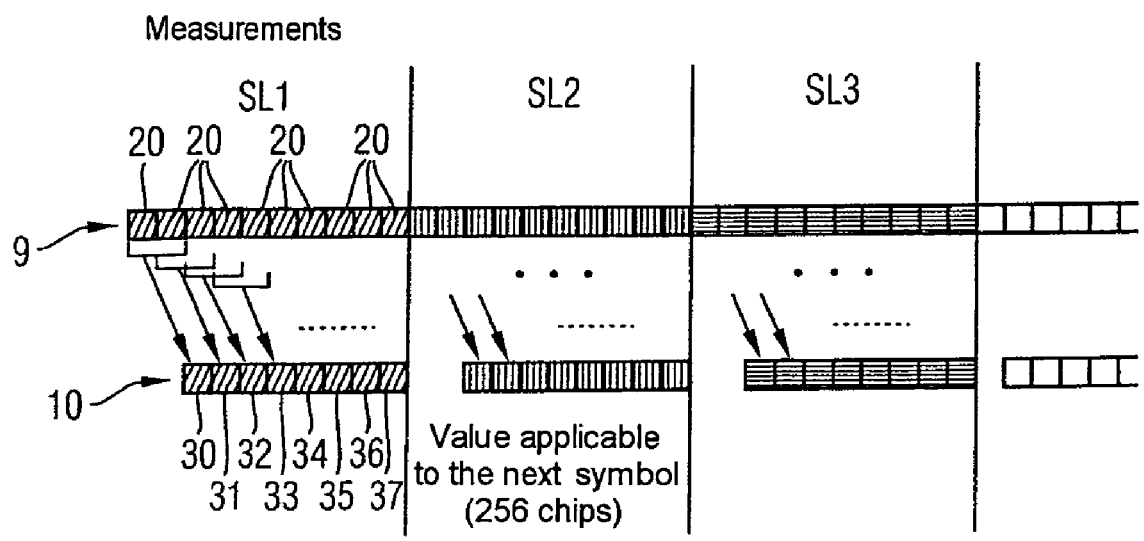

APPARATUS AND METHOD FOR READJUSTMENT OF A SAMPLING TIME IN RADIO RECEIVERS

REFERENCE TO RELATED APPLICATIONS

This application is a continuation of PCT/DE03/02963, filed on Sep. 5, 2003 which was not published in English, which claims the benefit of the priority date of German Patent Application No. DE 102 48 052.4, filed on Oct. 15, 2002, the contents of which both are herein incorporated by reference in their entireties.

FIELD OF THE INVENTION

The invention relates to an apparatus and a method for readjustment of a sampling time in a radio receiver.

BACKGROUND OF THE INVENTION

Since the signal processing in modern radio receivers is carried out digitally in the intermediate-frequency band or in baseband, the received analog signal must be sampled and digitized. This process is referred to as analog/digital (AD) conversion. The sampling frequency must, as is known, be chosen to be sufficiently high to satisfy the Nyquist condition. The optimum sampling time is governed by the time of maximum energy in a received information unit (bit or chip). This optimum sampling time is, however, not known during the sampling process. This means that the sampled discrete-value received signal generally has a sampling time error (discrepancy between the sampling time used and the optimum sampling time).

The sampling time error of the discrete-value received signal is normally corrected by means of an early/late correlator and an interpolator. The early/late correlator receives the discrete-value received signal, which has been double oversampled, correlates it with a sequence that is known in the receiver, and compares the signal energies of the early and late samples over a specific time period. The early/late correlator uses this comparison to determine a sampling time error signal which indicates the discrepancy between the sampling time and the optimum sampling time (if, for example, the signal energy in the early samples is of the same magnitude as the signal energy in the late samples, the optimum sampling time is precisely in the center between the sampling times for the early and the late samples). This sampling time error signal is supplied to an interpolator. The interpolator recalculates the sample values of the discrete-value received signal at support points which are shifted with respect to the sampling times by the sampling time error that has been determined. The sampling time is thus readjusted computationally. The received signal values converted to the optimum sampling time are then produced at the output of the interpolator.

Since the early/late correlator determines the sampling time error signal from the received data, the sampling time error signal emitted from the early/late correlator is noisy. This leads to fluctuations in the drive for the interpolator, which are undesirable. The sampling time error signal therefore has to be filtered.

The filtering of the sampling time error signal is subject to contradictory requirements. On the one hand, the filter must have a narrowband filter characteristic (with a bandwidth of about 2 kHz for UMTS) in order to achieve a high degree of noise suppression. Relatively high-order filters are therefore required. On the other hand, the filter should have as short a delay (latency) as possible, and should involve as little implementation complexity as possible for cost and space reasons.

Furthermore, the receiver is used not only for data reception but also for measurement tasks, such as the measurement of signal power levels. While a high degree of noise suppression is required for data reception, the filter for filtering the sampling time error signal must stabilize as quickly as possible and must have short latency for the measurement tasks, which frequently are carried out only briefly, in order that the measurement takes as little time as possible.

In previous solutions, all the sampling time error values in a time slot are combined by summation to form a sampling time error value. These combined sampling time error values, which are calculated for each time slot, are averaged over two or more time slots. This results in a filter with a sufficiently good filter characteristic. The result of the filtering is in each case applied to the next time slot since this means that there is no need to temporarily store the received data.

The document WO 01 33793 A discloses the sampling time error of a sampled received signal being determined by means of an appropriate apparatus. The sampling time error signal determined in this way is then passed to a filter. The filtered sampling time error signal is used to control an interpolator, which produces a received signal which has been corrected by the sampling time error.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to an apparatus for readjustment of a sampling time of a discrete-value received signal in a radio receiver, which has as little implementation complexity as possible and satisfies the requirements for filter quality and latency. The invention is also directed to a method which allows the advantages mentioned above.

Accordingly, the apparatus for readjustment of a sampling time comprises a component for determination of any sampling time error in a discrete-value received signal, that emits a sampling time error signal. The apparatus also comprises a filter arrangement for filtering the sampling time error signal, wherein the filter emits a filtered sampling time error signal. The apparatus also comprises a correction element that receives the discrete-value received signal and the filtered sampling time error signal and emits a discrete-value received signal whose timing has been corrected in accordance with the sampling time error. According to the invention, the filter arrangement has a multi-rate filter which comprises at least two individual filters and a sampling rate reduction stage in order to produce the filtered sampling time error signal.

The use of a multi-rate filter is based on the discovery that, because of the narrow bandwidth of the sampling time error signal (for example 2 kHz for UMTS), its sampling rate (for example 15 kHz for UMTS) is generally much higher than is necessary. The sampling rate can thus be reduced during the filtering process without having to accept a deterioration in the filter characteristic.

In one embodiment of the invention, the filter arrangement for producing the filtered sampling time error signal also has a digital filter whose group delay time is shorter than the group delay time of the multi-rate filter, and a selection device which can be used to select whether the filtered sampling time error signal is produced by means of the multi-rate filter or the digital filter. The selection device enables the digital filter to be used to filter the sampling time error signal whenever it is necessary for the filter arrangement to stabilize as quickly as possible, for example, when a power measurement is being carried out on the received signal in the receiver. When data reception is resumed, the multi-rate filter can again be selected, via the selection device, in order to filter the sampling time error signal.

The multi-rate filter rate change is preferably determined by the sampling rate at the output of the multi-rate filter being an integer multiple of the time slot frequency specified in the radio transmission standard. In particular, the sampling rate at the output of the multi-rate filter may be identical to the time slot frequency.

In one example, the group delay time of the digital filter corresponds to one sampling time period of the sampling time error signal (at the input of the digital filter). Since the group delay time is that time period by which the sampling time error signal is delayed in the digital filter, this means that the filter latency corresponds to only one sampling time period of the sampling time error signal. If the sampling time period is identical to the symbol time period, a sampling time error value determined on the basis of a previous symbol can itself be used for correction of the received signal during the subsequent symbol.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in the following text using exemplary embodiments and with reference to the drawings, in which:

FIG. 4 is a time slot diagram illustrating a method of operation of the multi-rate filter shown in FIG. 2 during data reception according to another embodiment of the invention; and FIG. 5 is a time slot diagram illustrating a method of operation of the filter arrangement shown in FIG. 3 during measurements according to yet another embodiment of the invention.

DETAILED DESCRIPTION OF THE INVENTION

Figure 1:
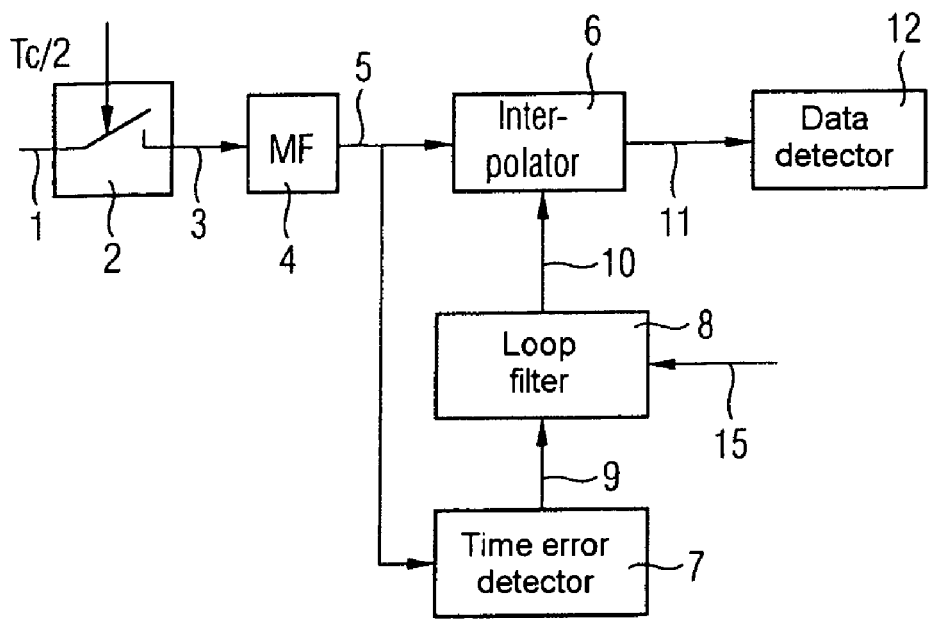
FIG. 1 is a schematic circuit diagram illustrating an apparatus for readjustment of a sampling time according to one embodiment of the invention.

As can be seen from FIG. 1, an analog received signal 1 is sampled by an A/D converter 2 at twice the chip rate $2*Tc^{-1}$, and in the process is converted to a discrete-time and discrete-value received signal 3. Tc denotes the chip time period. The analog received signal 1 is in the intermediate-frequency range, or is in the form of a baseband signal. It is normally produced by means of a reception filter and a mixing stage from an analog antenna signal. The analog received signal 1 may be the I (in-phase) or Q (quadrature) component of the filtered and down-mixed antenna signal.

The discrete-value received signal 3 is passed to a matched filter MF 4, and is filtered therein. The output signal 5 from the matched filter 4 is passed both to an interpolator 6 and to a time error detector 7 (early/late correlator). The output of the time error detector 7 is connected to the input of a loop filter 8. The loop filter 8 optionally has a further input, via which a control signal 15 can be applied. The loop filter 8 emits a control signal 10 for the interpolator 6, which is also referred to as a filtered sampling time error signal 10. The interpolator 6 produces an interpolated (that is to say with its timing error corrected) discrete-value received signal 11 at its output. As already explained, this is calculated by signal interpolation at the (optimum) support points, whose timing errors have been corrected. The interpolated received signal 11 is passed to a data detector 12 for further data processing. The data detector 12 may in principle be designed as required and to detect the received data, that is to say to reconstruct the transmitted signal in the receiver. In addition to data reception, the data detector 12 is also used for measurement purposes, for example for measurement of channel parameters, for measurement of the signal power level, or for measurement of the signal-to-noise ratio. The data detector 12 may, for example, be in the form of a rake demodulator.

For UMTS (Universal Mobile Telecommunications System) receivers, data reception is subject to the following requirements: the symbols on the common pilot channel CPICH (Common Pilot Channel) are used to determine the sampling time error. Each time slot has a duration of 0.66 ms and comprises 2560 chips, so that the sampling rate for double oversampling is $(Tc/2)^{-1}=7.68$ MHz. $Tc=0.2604$ μs is the chip time period, which is specified as fixed in the UMTS standard. Since the spreading factor sf in the CPICH channel is sf=256, each time slot contains 10 pilot symbols (the symbol time period is calculated from the product of the spreading factor sf and the chip time period Tc). The correlation process in the early/late correlator 7 is carried out using the sequence of 256 chips which represents one pilot symbol. The integration time of the early/late correlator 7 is in consequence one symbol time period (256 chips), so that the sampling time error signal which is emitted at the output of the early/late correlator 7 is at a sampling rate of 15 kHz—that is to say the symbol rate in the CPICH channel.

The sampling time error signal 9 in UMTS receivers has a very narrow bandwidth. The bandwidth is governed by the Doppler effect and the frequency offset of the oscillator. The Doppler effect leads to a bandwidth B of $B=f_0*v/c$, where $f_0$ is the transmission frequency, c is the speed of light and v is the velocity of the receiver relative to the transmitter. For a transmission frequency of $f_0=2$ GHz, as is used for UMTS, this results in a maximum bandwidth of B=2 kHz.

The loop filter 8 is, according to the invention, in the form of a multi-rate filter, that is to say it filters the sampling time error signal and at the same time reduces its sampling rate by, for example, a factor of 10, that is to say to 1.5 kHz (which corresponds to the time slot frequency). This filtered sampling time error signal 10 controls the interpolator 6. To be more precise, each value of the filtered sampling time error signal 10 predetermines a time offset between the previous sampling time and the timing of the new support point with respect to which the interpolated sample value must be calculated. The interpolator 6 is reset for each new filtered sampling time error value.

Figure 2:
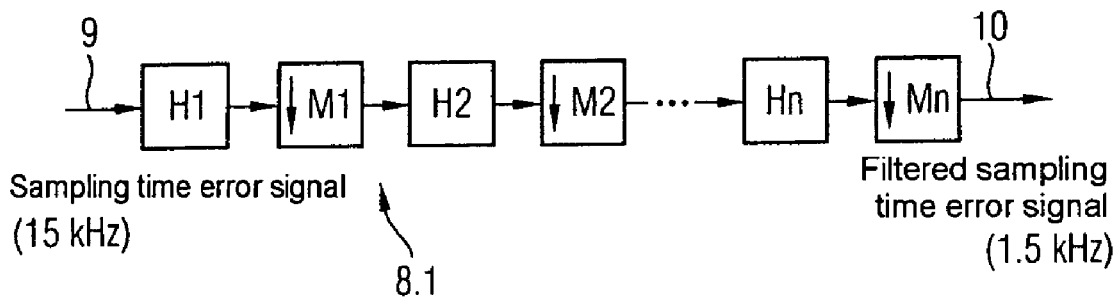
FIG. 2 is a block diagram illustrating another exemplary embodiment of a filter arrangement according to the invention, comprising a multi-rate filter in the form of a chain of individual filters and decimators.

FIG. 2 shows the design of a first embodiment 8.1 of the loop filter 8. The loop filter 8.1 comprises a chain of alternately arranged digital individual filters H1, H2, . . . , Hn and decimators M1, M2, . . . , Mn. The sampling rate change of the respective decimator M1, M2, . . . , Mn is denoted by m1, m2, . . . , mn. The product of the sampling rate changes m1*m2* . . . *mn is expediently chosen such that m1*m2* . . . *mn*$T_s^{-1}$ is an integer multiple of the time slot frequency. For example, a filter chain may be formed from two filters H1 and H2 and two decimators M1 and M2, with m1=5 and m2=2. The filter chain contains at least two individual filters and a decimator arranged between them.

Figure 3:
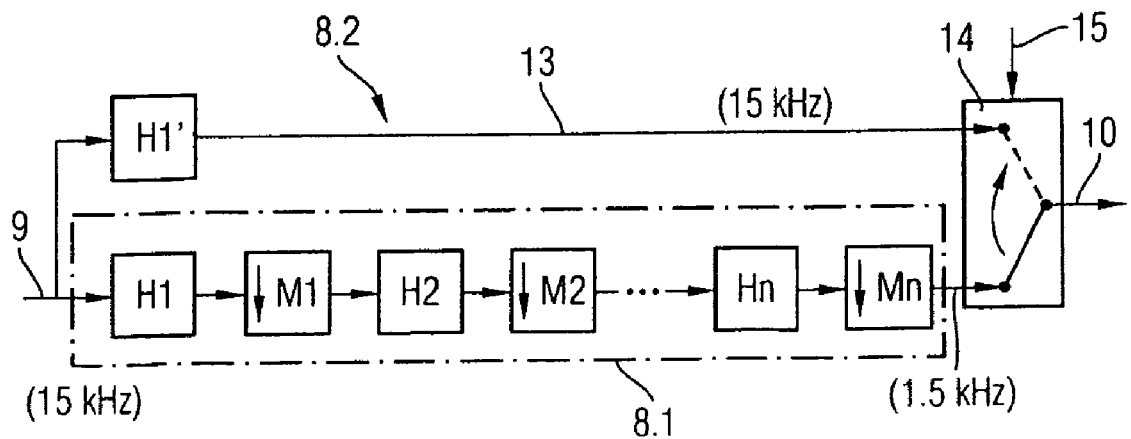
FIG. 3 is a block schematic diagram illustrating still another exemplary embodiment of a filter arrangement according to the invention, comprising a multi-rate filter and a filter for measurement tasks arranged in parallel therewith.

FIG. 3 shows a second embodiment 8.2 of the loop filter 8 illustrated in FIG. 2. In addition to the cascaded filter chain 8.1 which has already been explained in FIG. 2, the loop filter 8.2 has a further digital filter H1', which is connected in parallel with the filter chain 8.1. The output signal from the digital filter H1' as well as the output signal from the filter chain 8.1 are passed to a selection switch 14. The selection switch 14 is controlled by the control signal 15. The control signal 15 determines which of the two filter outputs will produce the filtered sampling time error signal 10 at the output of the loop filter 8.2.

The digital filter H1' has a lower filter quality and a shorter group delay time than the filter chain 8.1. In consequence, the stabilization time of the digital filter H1' is shorter than the stabilization time of the filter chain 8.1. The selection switch 14 is controlled in such a way that the filtered sampling time error signal 10 is produced by means of the filter chain 8.1 during data reception, while the filtered sampling time error signal 10 is produced by the digital filter H1' during measurements.

FIGS. 4 and 5 show the method of operation of the loop filter 8 in the two operating modes. Both figures show three successive time slots SL1, SL2, SL3. Boxes symbolize CPICH symbols. The upper row of boxes in FIGS. 4 and 5 in each case illustrates the sampling time error signal 9 emitted from the time error detector 7. One and only one sampling time error value 20 is produced for each CPICH symbol. When receiving data (FIG. 4) with the selection switch 14 in the position shown in FIG. 3, one and only one filtered sampling time error value 21 is generated for each time slot owing to the reduction in the data rate in the loop filter 8.1. This filtered sampling time error value 21, which is illustrated in the lower row in FIG. 4, is used to control the interpolator 6 over the entire next time slot SL2. A filtered sampling time error value 21' which has been determined over the time period of the time slot SL2 is used analogously to control the interpolator 6 in the time slot SL3, and so on.

In the measurement operating mode (FIG. 5), faster readjustment of the sampling time is required, with less accuracy. The selection switch 14 now connects the output of the digital filter H1' to the input of the interpolator 6. A filtered sampling time error value is calculated for each CPICH symbol. The group delay time (delay) of the digital filter H1' is, as is shown in FIG. 5, an unfiltered sampling time error value, that is to say the symbol time period. The interpolator 6 is controlled at the symbol clock rate using the filtered sampling time error values 30, 31, 32, 33, 34, 35, 36, 37. A filtered sampling time error value is in this case valid over only one symbol time period, that is to say the sampling rate of the unfiltered sampling time error signal 9 is identical to the sampling rate of the filtered sampling time error signal 10.

If a measurement is intended to be carried out from the data reception mode, the selection switch 14 is switched over by being driven via the control signal 15, measurement is carried out, and the selection switch 14 is switched back to the initial position again by once again using the control signal 15 to control it (FIG. 3).

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. An apparatus for readjustment of a sampling time in a radio receiver, comprising:
   means for determining a sampling time error in a first discrete-value received signal, and emitting a sampling time error signal in response thereto;
   a filter arrangement configured to filter the sampling time error signal and emit a filtered sampling time error signal in response thereto; and
   a correction element configured to input the first discrete-value received signal and the filtered sampling time error signal and emit a second discrete-value received signal comprising a corrected timing in accordance with the sampling time error, wherein the filter arrangement comprises a multi-rate filter that comprises at least two series connected individual filters and a sampling rate reduction stage arranged between the at least two series connected individual filters in order to produce the filtered sampling time error signal,
   wherein a rate change in the multi-rate filter is determined by a sampling rate at an output of the multi-rate filter being an integer multiple of a time slot frequency specified in a radio transmission standard used for transmitting the first discrete-value received signal.

2. The apparatus of claim 1, wherein the sampling rate at the output of the multi-rate filter is identical to the time slot frequency.

3. The apparatus of claim 1, wherein the determining means for determining the sampling time error comprises an early/late correlator.

4. The apparatus of claim 1, wherein the correction element comprises an interpolator.

5. An apparatus for readjustment of a sampling time in a radio receiver, comprising:

means for determining a sampling time error in a first discrete-value received signal, and emitting a sampling time error signal in response thereto;

a filter arrangement configured to filter the sampling time error signal and emit a filtered sampling time error signal in response thereto;

a correction element configured to input the first discrete-value received signal and the filtered sampling time error signal and emit a second discrete-value received signal comprising a corrected timing in accordance with the sampling time error, wherein the filter arrangement comprises a multi-rate filter that comprises at least two individual filters and a sampling rate reduction stage in order to produce the filtered sampling time error signal, wherein the filter arrangement further comprises:

a digital filter substantially in parallel with the multi-rate filter, and having a group delay time that is shorter than a group delay time of the multi-rate filter; and a selection device configured to select a filtered sampling time error signal from one of the multi-rate filter or the digital filter.

6. The apparatus of claim 5, wherein the group delay time of the digital filter corresponds to one sampling time period of the sampling time error signal.

7. A method for readjustment of a sampling time in a radio receiver, comprising:

producing a sampling time error signal that indicates a sampling time error of a first discrete-value received signal;

digitally filtering and decreasing a sampling rate of the sampling time error signal by means of a multi-rate filter; and producing a second discrete-value received signal with a corrected timing from the first discrete-value received signal and the filtered and reduced-rate sampling time error signal;

filtering the sampling time error signal with a digital filter having a group delay time that is shorter than the group delay time of the multi-rate filter; and selecting whether the filtered sampling time error signal is produced by means of the multi-rate filter or the digital filter.

8. The method of claim 7, further comprising using the filtered sampling time error value that is emitted from the digital filter to correct a timing of the first discrete-value received signal over the time period of one sampling time period of the sampling time error signal.

9. The method of claim 7, further comprising using the filtered sampling time error value that is emitted from the multi-rate filter to correct a timing of the first discrete-value received signal over the time period of one time slot.

10. The method of claim 7, wherein the sampling time error signal is produced by means of an early/late correlator.

11. The method of claim 7, wherein a timing of the first discrete-value received signal is corrected by interpolation.

12. The method of claim 7, wherein the readjustment method is used for a radio signal based on the UMTS standard.

13. A receiver including a sampling time error circuit, comprising:

an analog to digital converter circuit configured to receive an analog input signal and generate a digital output signal corresponding thereto;

an early/late correlator circuit configured to generate a sampling time error signal based on the digital output signal; and a loop filter configured to receive the sampling time error signal and output a filtered sampling time error signal, wherein the loop filter comprises a multi-rate filter having two selectable filter paths, wherein a first filter path is selected for filtering the sampling time error signal during a data reception mode, and a second filter path is selected for filtering the sampling time error signal during a measurement mode.

14. The receiver of claim 13, further comprising an interpolator configured to receive the filtered sampling time error signal and the digital output signal and generate sample values that are shifted with respect to sample values associated with the digital output signal based on the filtered sampling time error signal.

15. The receiver of claim 13, wherein the first filter path of the multi-rate filter comprises a plurality of digital filter elements with a sampling rate reduction stage interposed therebetween.

16. The receiver of claim 15, wherein the second filter path comprises a digital filter having a shorter delay time than a delay time associated with the first filter path.

17. The receiver of claim 16, further comprising a selection circuit configured to selectively pass an output of the first filter path or the second filter path based on a control signal coupled thereto.

* * * * *